United States Patent [19]

Shapiro et al.

[11] 3,870,913

[45] Mar. 11, 1975

[54] ROTOR WINDING DIRECTLY COOLED BY LIQUID FOR USE IN NON-SALIENT POLE SYNCHRONOUS MACHINE

[76] Inventors: Aron Beniaminovich Shapiro, Basseinaya ulitsa 53, kv. 70; Vladimir Pavlovich Chernyavsky, Pulkovskaya ulitsa 17, kv. 185; Ibragim Akhmedovich Kadi-Ogly, ulitsa Chaikovskogo 15, kv. 24, all of Leningrad, U.S.S.R.

[22] Filed: May 18, 1973

[21] Appl. No.: 361,626

[52] U.S. Cl. .................................. 310/208, 310/54
[51] Int. Cl. ............................................ H02k 3/04
[58] Field of Search .................... 310/198, 202–208, 310/54, 52, 58, 61, 64, 65, 195, 45, 201

[56] References Cited
UNITED STATES PATENTS

| | | | |
|---|---|---|---|
| 3,322,985 | 5/1967 | Azbukin | 310/64 |
| 3,427,488 | 2/1969 | Terry | 310/65 |
| 3,435,261 | 3/1969 | Spiess | 310/58 |
| 3,469,125 | 9/1969 | Kranz | 310/54 |
| 3,652,882 | 3/1972 | Elliott | 310/61 |
| 3,743,875 | 6/1973 | Smith | 310/205 |
| 3,753,015 | 8/1973 | Konovalov | 310/64 |

Primary Examiner—R. Skudy

[57] ABSTRACT

The present invention relates to rotor windings directly cooled by a liquid and used in implicit-polar synchronous machines. The rotor windings comprise two groups of coils wound in different directions, disposed in one and the same slots. All the electric and hydraulic connections of the leadouts of the coils are disposed in the direct vicinity of the end portion at one side of the rotor, and are prevented from undergoing radial displacement by a retaining ring common for the winding and connections.

13 Claims, 4 Drawing Figures

ROTOR WINDING DIRECTLY COOLED BY LIQUID FOR USE IN NON-SALIENT POLE SYNCHRONOUS MACHINE

In accordance with the present invention, the rotor windings comprise two groups of coils wound in different directions, disposed in one and the same slots.

All the electric and hydraulic connections of the leadouts of the coils are disposed in the direct vicinity of the end portion at one side of the rotor, and are prevented from radial displacement by a retaining ring common for the winding and connections.

The winding according to the present invention is highly reliable and simple in manufacture. As a result of the employment of the winding, the length of the rotor is decreased and the arrangement and fixation of the hydraulic and electric connections of the lead-outs of the coils are simplified.

All the hydraulic and electric connections of the coils have an easy access used for performing their assembly, control and repair.

The present invention relates to electric machines and, more particularly, to rotor windings directly cooled by liquid and used in non-salient pole synchronous machines.

Known in the art is a rotor winding directly cooled by liquid and used in non-salient pole synchronous machines, in which the slots of each rotor pole accomodate a group of coils connected electrically in series and hydraulically in parallel, wound in the same direction and having lead-outs disposed at one side of the rotor beyond the end portion in separate compartments accomodating the hydraulic and electric connections. Additionally, to increase the amount of the cooling liquid passed through the winding, hydraulic connections are also provided at the other side of the rotor to supply the cooling liquid to and to drain it from the elongated conductors of the end portion.

Such rotor windings possess the following disadvantages: necessity of providing elongated lead-out of the coils; disposition of the electric and hydraulic connections at both sides of the rotor in separate compartments limited by additional retaining and thrust rings disposed before the retainer units of the rotor winding.

All this results in an increase in the length of the rotor, weakening of its shaft and a considerable complication of the design due to the supply of the liquid at both sides of the rotor.

It is an object of the present invention to eliminate the afore-mentioned disadvantages.

The main object of the present invention is to provide a coil winding of a rotor, whose circuit and arrangement of the lead-outs make it possible to dispose all electric and hydraulic connections in a more compact and simpler manner at one side of the rotor, and provide a free access to these connections to assemble, control and repair the latter, as well as a decrease in the length of the rotor.

This object is accomplished in that in a rotor winding directly cooled by liquid and used in non-salient pole synchronous machine, the slots of each rotor pole accomodate a group of coils connected electrically in series and hydraulically in parallel, arranged concentrically, wound is one and the same direction and having lead-outs axially disposed at one side of the rotor beyond the end portion, and according to the present invention, the same slots accomodate a second group of concentrically-disposed coils arranged in such a manner that the coils of one group are disposed in the lower portions of the slots, which are the nearest to the rotor axis, and the coils of the other group are disposed in the upper portions of the slots, which are nearest to the outer surface of the rotor, the lead-outs of the coils of the second group being disposed axially and extending beyond the end portion on the same side of the rotor as the lead-outs of the coils of the first group, with which the coils of the second group are connected electrically in series and hydraulically in parallel.

It is preferable to wind the coils of the second group in a direction opposite to the direction of winding of the coils of the first group.

It is also preferable to axially place the upper and lower lead-outs of the upper coils and to dispose them coaxially with respect to the conductors adjacent to the terminals in the slots, and to place the upper and lower leadouts of the lower coils, after they come out of the slots, along the end portion of their coils, and to extend them axially beyond the end portion in the sectors of disposition of the respective upper and lower lead-outs of like polarity of the upper coils.

It is desirable to dispose the turn-to-turn transitions of the lower coils, formed by the displacement of all the conductors of these coils in the radial direction towards the axis of the rotor over the height of one conductor at the point where the lower lead-out of the coils comes out of the slots and along the axial portion of the end portion of the smallest lower coil.

It is also desirable to form a series electric connection of the coils of each pole by alternately switching in one coil of each group, beginning with the smallest coil in one group and with the largest one in the other group, the lead-outs of the coils being interconnected either directly, or by means of jumpers of a solid cross section.

It is possible to make the inter-polar connection in the winding of a bipolar rotor in the zone of the axial portion of the end portion at the side of the lead-outs of the coils as, at least, two jumpers of a solid section, each jumper connecting the upper conductor adjacent to the lead-out of the largest upper coil of one pole with the adjacent upper conductor of the largest upper coil of the other pole.

It is preferred to dispose the electric and hydraulic connections of the lead-outs of the coils in the direct vicinity of the end portion, and to prevent them from undergoing radial displacement by means of a retaining ring common for the winding and for the connections.

The rotor winding with direct cooling by the present invention is highly reliable and simple in manufacture, and provides, at the same time, for a decrease in the length of the rotor and simpler arrangement and fastening of the hydraulic and electric connections of the lead-outs of the coils.

All the hydraulic and electrical connections of the coils are accessible for carrying out their assembly, control and repair.

The following description of an exemplary specific embodiment of the present invention is given with reference to the accompanying drawings, in which.

Figure 1:
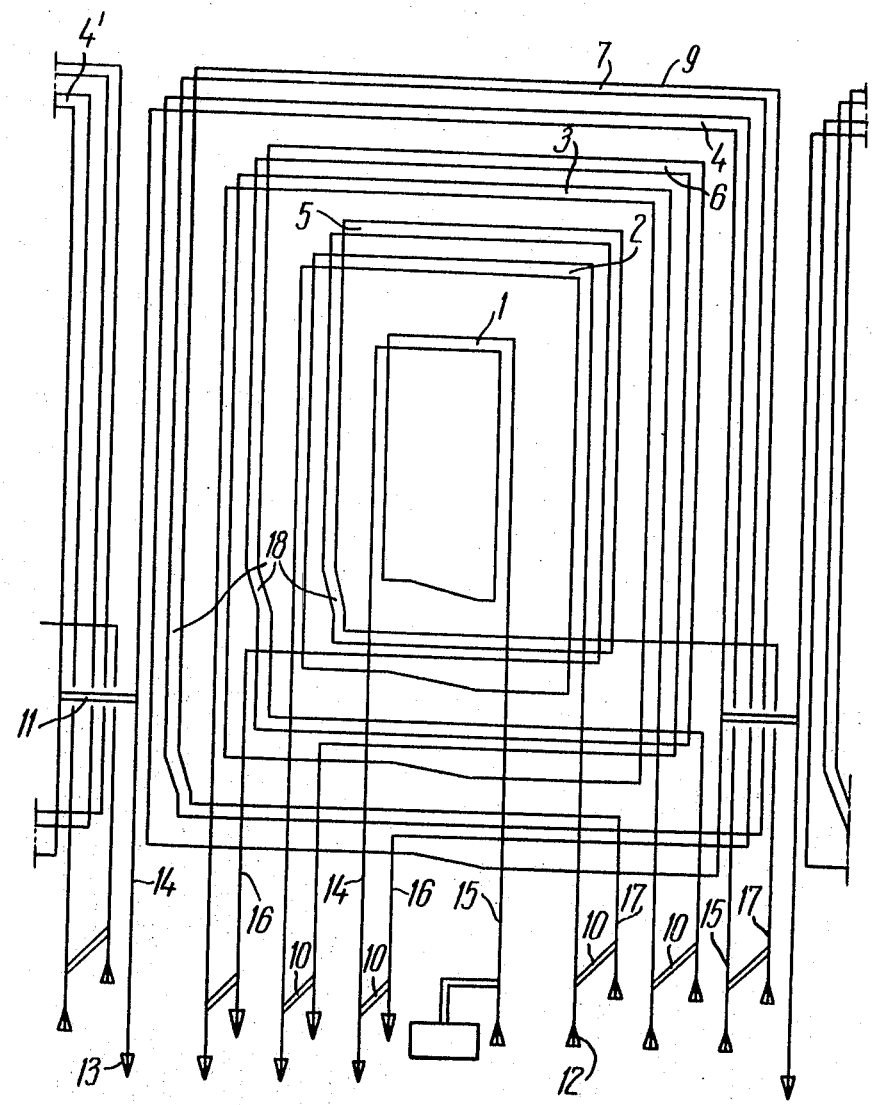
FIG. 1 shows a simplified electric circuit of the winding of a bipolar rotor, according to the invention.

A rotor winding comprises for each pole two groups of coils 1 to 4 and 5 to 7 (FIGS. 1 to 4), the coils 5 to 7 of one group being disposed in the lower portions of slots, and the the coils 2 to 4 of the other group being disposed in the upper portions of the same slots and being insulated from the respective coils 5 to 7 of the first group. In accordance with the embodiment of the rotor winding, only one coil 1 relating to the second group is placed in shortened slots which are the nearest to a large tooth 8 (FIG. 4).

However, in accordance with other variants these slots may also accomodate coils of the first and second groups, each coil having two turns. In the circuit shown in FIG. 1 hollow conductors 9 are designated by one line, conductors (jumpers) 10 and 11 of a solid cross section - by two parallel lines, and points of supply and discharge of the coolant liquid 12 and 13, respectively, — by arrows.

The coils 5 to 7 of the first group are wound in a direction opposite to the direction of winding of the coils 1 to 4 of the second group.

Upper and lower lead-outs 14, 15 respectively of the coils 1 to 4 of the second group axially extend from the slot beyond the end portion, and are disposed coaxially relative to the conductors adjacent thereto in the slots.

Upper and lower lead-outs 16, 17 respectively of the coils 5 to 7 of the first group are laid along the end portions of their coils and extend axially beyond the end portion in the sectors of disposition of the lead-outs of like polarity of the coils of the second group.

To provide for free disposition of the upper lead-outs 16, the turn-to-turn transitions 18 of the coils 5 to 7 of the first group, formed by the portions of all the conductors of these coils bent towards the axis of the rotor for the height of one lead, are disposed at the point where the lower lead-out of the coils comes out of the slot and along the axial portion of the end portion of the smallest coil 5 of the first group. The turn-to-turn transitions of the largest coil 7 of the first row only can be disposed at any point of the axial portion of the coil at the side where its lower lead-out comes out of the slot.

The series electric connection of the coils of the pole is effected with the aid of radially-disposed jumpers 10 of solid cross section, and in the series circuit thus formed, the coils 1 to 4 of the second group, beginning with the smallest coil 1, are arranged alternately with the coils 5 to 7 of the first group, beginning with the largest coil 7.

The inter-pole connections of the windings are formed by the two jumpers 11 of solid cross section, disposed in the end portion at the side of the lead-outs and each connecting the upper conductor adjacent to the terminal of the largest coil 4 of the second group of one pole with the adjacent upper conductor of the largest coil $4^1$ of the second group of the other pole. This interpole connection is easy to be effected and provides for a complete symmetry of the rotor, i.e. weight, thermal and magnetic one.

Insulations 19, 20, 21 and 22 (FIGS. 2-4) of the lead-outs of the coils and jumpers are strenghtened at the points of their intersection with the conductors of the other coils.

The turn-to-turn transitions in the coils 1 to 4 of the second group are, as usual, arranged in the tangential portions of the end portion. To uniformly distribute the mechanical forces acting from the side of the end portions of the coils of the first group upon the end portions of the coils of the second group and all the end portions upon a retaining ring 23, wedges 24 (FIG. 4) are secured thereto and to the conductors of the coils of the second group at the points of the turn-to-turn transitions from the top and from the bottom.

For the same purpose, the coils of the first group have wedges 24 (FIG. 2) also secured to the upper conductors at the points of the turn-to-turn transitions.

Figure 2:
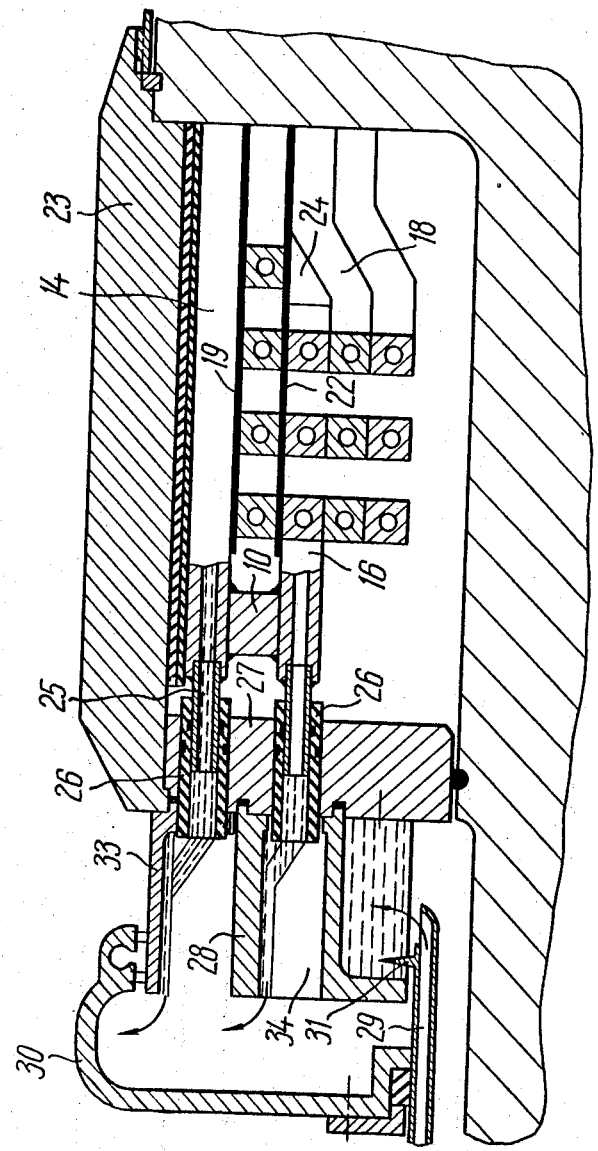
FIG. 2 is a longitudinal section of the end portion of the rotor as viewed from the upper lead-outs, according to the invention.
Figure 3:
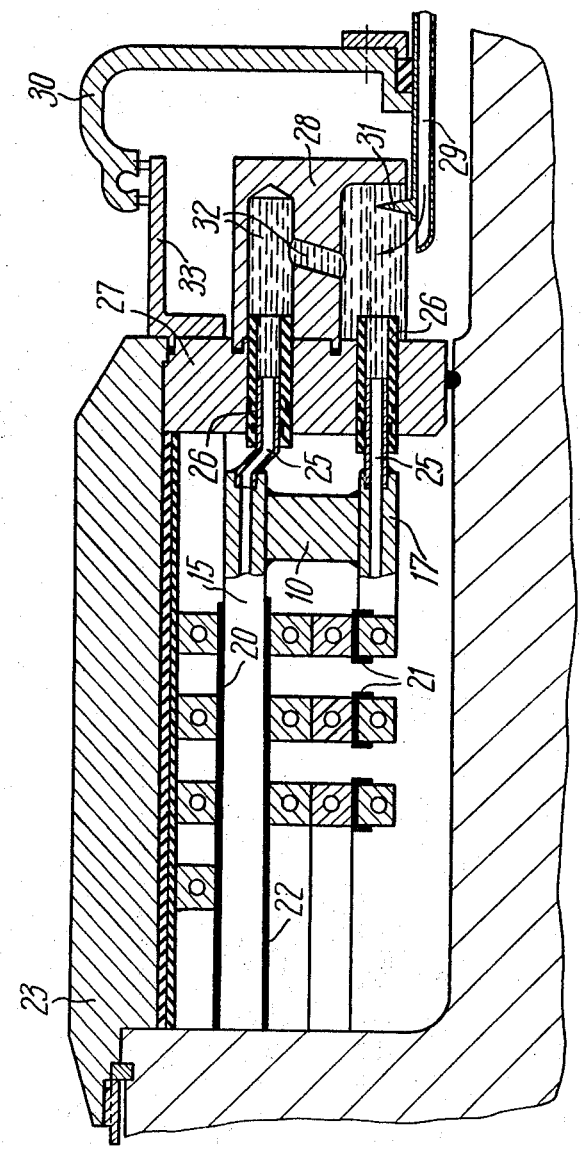
FIG. 3 is a longitudinal section of the end portion of the rotor as viewed from the lower lead-outs of the coils, according to the invention.
Figure 4:
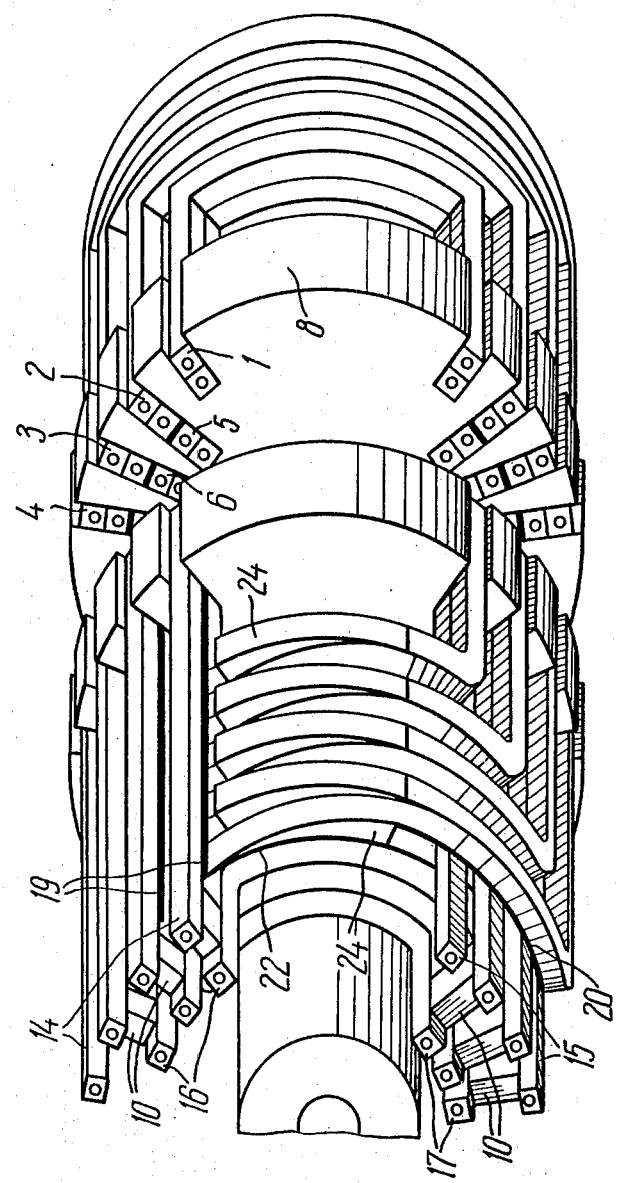
FIG. 4 is a perspective view from outside the rotor winding, according to the invention.

Connection to the lead-outs of the coils is made by metallic pipes 25 passed through insulating pipes 26 (FIGS. 2 and 3). The cooling liquid is supplied from a pressure collector open in the direction of the shaft and formed by a thrust ring 27 and a shaped ring 28, to which the cooling liquid is delivered in the form of an open stream from ducts 29 made in a ring which is hermetically secured in a body 30 of a hydraulic supply line.

An annular projection 31 seals the body 30 of the hydraulic supply line against the ambient air at the side of the shaft. The liquid is picked-up by the rotating rotor and flows through the lower lead-outs of the coils 5 to 7 of the first group, and is passed through local ducts 32 connected to the lower lead-outs of the coils 1 to 4 of the second group along all the turns of the coils.

Thereupon, the liquid flows from the coils 1 to 4 of the second group onto the inner surface of a drain ring 33 secured to the thrust ring 27, from which it flows into the body 30 of the hydraulic supply line, and from the coils 5 to 7 of the first group also flows through openings 34 (FIG. 2) in the shaped ring 28 into the body 30 of the hydraulic supply line.

The electric and hydraulic connection disposed near the end portions of the winding are prevented from undergoing radial displacement by the retaining ring 23 common for the winding and the connections, and from undergoing axial displacement by the thrust ring 27. The retaining ring 23 and the thrust ring 27 form a retainer unit secured on the rotor body.

The circuit and design of the winding according to the present invention make it possible to use other systems of feeding the cooling liquid, wherein it is supplied and drained through ducts in the shaft, as well as to directly electrically connect the upper lead-outs 14 and 16 and the lower lead-outs 15 and 17 without using any jumpers 10 of a solid cross section, for instance by connecting them to a common shoe and supplying the cooling liquid, not through two, but through one common pipe.

When using other cooling systems, the direction of the liquid flow in the coils may differ from that shown by the arrows in FIGS. 1-3.

We claim:

1. A rotor winding directly cooled by liquid, for use in the slots of a rotor of a non-salient pole synchronous machine, said rotor winding comprising pole windings including one group of concentrically disposed coils wound in one and the same direction of each pole and a second group of concentrically disposed coils wound in one and the same direction of each pole, said second group of coils being disposed in the same slots as said first group of coils, lead-outs for said coils of both groups arranged axially at one side of the rotor and extending beyond the end portions thereof, said coils of one group being disposed in the lower portions of the slots nearest to the rotor axis while said coils of the other group are disposed in the upper portions of the slots nearest to the outer surface of the rotor, the coils of each pole being in electrical series connection by alternately switching-in one coil of each group beginning with the smallest coil in one group and the largest coil in the other group, and means interconnecting the lead-outs of the coils.

2. A rotor winding according to claim 1 wherein the means interconnecting the lead-outs comprises a direct connection therebetween.

3. A rotor winding according to claim 1 wherein the means interconnecting the lead-outs comprises radial jumpers of solid cross-section.

4. A rotor winding according to claim 1, in which the coils of the second group are wound in a direction opposite to that of the winding of the coils of the first group.

5. A rotor winding according to claim 1, in which the lead-outs are in upper and lower disposition, the upper and lower lead-outs of the upper coils extending axially and disposed coaxially relative to the respective conductors adjacent to the lead-outs in the slots, the upper and lower lead-outs of the lower coils, on coming out of the slots, extending along the end portions of their coils and axially extending beyond the end portion in the sectors of disposition of the respective upper and lower lead-outs of like polarity of the upper coils.

6. A rotor winding according to claim 1, in which turn-to-turn transitions of the lower coils, formed by the displacement of all the conductors of these coils in the radial direction towards the axis of the rotor over the height of a conductor are disposed at the point where the lower leadout of the coils comes out of the slot, and along the axial portion of the end portion of the smallest lower coil.

7. A winding of a bipolar rotor according to claim 1, comprising an inter-pole connection in the zone of an axial portion of the end portion at the side of the lead-outs of the coils including, at least, two jumpers of solid cross section, each jumper connecting the upper conductor adjacent to the lead-out of the largest upper coil of one pole with the adjacent upper conductor of the largest upper coil of the other pole.

8. A rotor winding according to claim 1, in which the electric and hydraulic connections of the lead-outs of the coils are disposed in the direct vicinity of the end portion, and comprising a retaining ring common for the winding and the connections to prevent radial displacement.

9. A rotor winding directly cooled by liquid, for use in the slots of a rotor of a non-salient pole synchronous machine, said rotor winding comprising pole windings including one group of concentrically disposed coils each wound in one and the same direction for each pole and a second group of concentrically disposed coils each wound in one and the same direction for each pole, said second group of coils being disposed in the same slots as said first group of coils, lead-outs for said coils of both groups arranged axially at one side of the rotor in radially juxtaposed rows and extending beyond the end portion thereof, said coils of one group being electrically insulated from the coils of the other group and disposed in the lower portions of the slots nearest to the rotor axis while said coils of the other group are superposed on the coils of said one group and disposed in the upper portions of the slots nearest to the outer surface of the rotor, said lead-outs of the upper coils being arranged in rows as upper and lower lead-outs extending axially from the slots and disposed coaxially relative to respective coils in the slots adjacent the lead-outs, the lead-outs of the lower coils also being arranged in rows as upper and lower lead-outs and extending from end portions of the coils, the lower coils having turn-to-turn transitions formed by the displacement of all the conductors of these coils in the radial direction towards the axis of the rotor over the height of one conductor, said turn-to-turn transitions being disposed at the point where the lower lead-outs of the lower coils come out of the slots along an axial portion of the length thereof.

10. A rotor winding according to claim 9, in which the coils of the second group are wound in a direction opposite to that of the winding of the coils of the first group.

11. A rotor winding according to claim 9 wherein the coils of each pole are in electrical series connection by alternately switching-in one coil of each group beginning with the smallest coil in one group and the largest coil in the other group, and means interconnecting the lead-outs of the coils.

12. A winding of a bipolar rotor according to claim 9, comprising an inter-pole connection in the zone of an axial portion of the end portion at the side of the lead-outs of the coils including, at least, two jumpers of solid cross section, each jumper connecting the upper conductor adjacent to the lead-out of the largest upper coil of one pole with the adjacent upper conductor of the largest upper coil of the other pole.

13. A rotor winding according to claim 9 wherein the means interconnecting the lead-outs comprises radial jumpers of solid cross-section.

* * * * *